US012663310B2

(12) United States Patent
Srowig et al.

(10) Patent No.: US 12,663,310 B2
(45) Date of Patent: Jun. 23, 2026

(54) LIGHT RECEIVER CIRCUIT AND LIGHT SENSOR ARRAY COMPRISING A LIGHT RECEIVER CIRCUIT

(71) Applicant: ELMOS SEMICONDUCTOR SE, Dortmund (DE)

(72) Inventors: André Srowig, Heidelberg (DE); Fabian Finkeldey, Bruchsal (DE)

(73) Assignee: ELMOS SEMICONDUCTOR SE, Leverkusen (DE)

( * ) Notice: Subject to any disclaimer, the term of this patent is extended or adjusted under 35 U.S.C. 154(b) by 547 days.

(21) Appl. No.: 18/226,422

(22) Filed: Jul. 26, 2023

(65) Prior Publication Data

US 2024/0035884 A1      Feb. 1, 2024

(30) Foreign Application Priority Data

Jul. 28, 2022      (DE) ..................... 10 2022 119 006.4

(51) Int. Cl.
| | |
|---|---|
| *G01S 17/931* | (2020.01) |
| *G01J 1/44* | (2006.01) |
| *G01S 7/481* | (2006.01) |
| *G01S 7/497* | (2006.01) |
| *G01S 17/89* | (2020.01) |
| *G06T 7/521* | (2017.01) |

(52) U.S. Cl.
CPC ................ *G01J 1/44* (2013.01); *G01S 7/497* (2013.01); *G01J 2001/444* (2013.01); *G01J 2001/4466* (2013.01)

(58) Field of Classification Search
CPC ................... G01J 1/44; G01J 2001/444; G01J 2001/4466; G01S 7/497; G01S 17/10; G01S 7/4865; G01S 17/931; G01S 7/4802; G01S 7/4861; G01S 7/4863
See application file for complete search history.

(56) References Cited

U.S. PATENT DOCUMENTS

2018/0210084 A1*   7/2018  Zwölfer ................ G01S 7/4865

FOREIGN PATENT DOCUMENTS

| DE | 20 2013 105 389 U1 | 2/2015 | |
|---|---|---|---|
| DE | 10 2020 101 451 A1 | 8/2020 | |
| WO | WO-2020184224 A1 * | 9/2020 | ........... G01S 17/894 |

OTHER PUBLICATIONS

English Translation of Jun. 28, 2024 Office Action issued in German Patent Application No. 10 2023 119 480.1.

* cited by examiner

*Primary Examiner* — Francis Geroleo
(74) *Attorney, Agent, or Firm* — Oliff PLC

(57) ABSTRACT

A light receiver circuit with compensation of propagation times has at least one light sensor, one control circuit, one connecting line to a TDC circuit, and a test circuit. The test line is connected to a test signal source. The test circuit connects the test line to the control circuit and forwards the test signal to the control circuit. The control circuit routes a measurement signal of the light sensor to the TDC circuit and a test signal to the connecting line and to the TDC circuit to evaluate the test signal and propagation time of test signal from test circuit to TDC circuit. The light sensor array further includes a plurality of light receiver circuits of such kind. The invention also relates to a Lidar receiver for capturing optical events with a light sensor array with a TDC circuit and a test signal source and with a timecode generator.

24 Claims, 5 Drawing Sheets

LIGHT RECEIVER CIRCUIT AND LIGHT SENSOR ARRAY COMPRISING A LIGHT RECEIVER CIRCUIT

The present invention relates to a light receiver circuit for the detection of optical events with a propagation time compensation, with a light sensor, a control circuit and a connecting line to a time-digital converter circuit (TDA; circuit) for evaluating a light signal received by the light sensor.

Electronic circuits typically need a clock or time generator that delivers extremely precise clock signals or time signals to synchronise individual modules in the electronic circuits. In sensor circuits or in circuits for measuring distance, for example, such as are used in a vehicle and implemented in the automotive industry, signal propagation times are determined to enable distances from objects to be calculated with extreme precision. For example, the area surrounding a vehicle is detected with such systems, and in this context it is important for the time to be measured very accurately.

In order to provide a precise clock pulse, use is often made of synchronously operating electronic circuits that work at high clock frequencies. Such circuits are typically expensive, prone to malfunction, delicate, and of only limited suitability for use in the automotive industry, although clock frequencies of a sufficiently high order would be possible to enable resolution suitable for distance measurement. Besides these, asynchronously operating electronic circuits for generating a clock or time code are also known.

Time generators are also used that are based on the classic vernier scheme, which enables a time-to-digital conversion with high resolution. However, in this case scaling on many channels is only possible to a limited degree, and consequently high-resolution systems with many parallel measurement channels require a large number of time generators. This in turn entails a considerably increased space requirement and energy consumption, which is why such circuits are usually not used in the automotive industry.

Sensor arrays comprising a plurality of sensors or photodiodes are often used to fulfil the function of sensors for distance measurement or for detecting surroundings. Known examples of such arrays are so-called single-photon avalanche diode detectors (SPAR detectors), in which several of these single-photon avalanche diodes are interconnected to create an array. Such avalanche diodes connected in an array are used as lidar sensors, in vehicles for example.

In photodiodes that are connected together to form an array, the connection of the individual photodiodes of the array to the surrounding readout electronics is particularly critical, as the propagation time differences that arise affect the absolute accuracy of the measurement. Even if the time generator delivers two signals with the utmost precision, the propagation time differences that occur in the array can cause problems and incorrect measurements. Open or short-circuited connections can also present a so-called single-point-failure for one or more pixels, that is to say for one or more of the diodes.

Accordingly, the need is great for a light receiver circuit with which the known problems of propagation time differences are remedied and an extremely accurate measurement of distances or of the area around the sensor is enabled.

The present object is solved with a light receiver circuit having the features of a first embodiment, a light sensor array having the features of a second embodiment, a lidar receiver having the features of a third embodiment, a lidar system having the features of a fourth embodiment, and a method for compensating propagation time differences having the features of a fifth embodiment.

According to a first aspect, the present invention relates to a light receiver circuit with at least one light sensor and one control circuit for selecting and controlling the light sensor. The light receiver circuit further comprises a connecting line to a time-digital converter circuit (TDC circuit) for evaluating a light signal received by the light sensor. The light receiver circuit comprises a test line, one end of which has an electrical test signal source for generating an electrical test signal, and a test circuit for relaying the test signal to the control circuit of the light sensor. The test circuit is connected to the test line and the control circuit of the light sensor. A test signal that is generated by the test signal source is passed through the control circuit of the light sensor to the connecting line and onwards to the TDC circuit. In this way, the test signal and the propagation time of the test signal from the test circuit to the TDC circuit are evaluated. This is a prerequisite for enabling different propagation times of the test signal to be determined, so that compensation can be made for propagation time differences that arise during measurements with the light sensor. Particularly in a circuit for distance measurement or detecting the surrounding area that comprises multiple light receiver circuits with light sensors, compensation for the propagation times of the measurement signals is both desirable and necessary.

According to the invention, electrical test signals are used as reference signals. In this way, local differences in propagation time can be detected and measured so that the light receiver circuit can operate independently of its position in an array and the measurement results are independent of line lengths for its control and of line lengths for the evaluation of the measurement signals.

According to a further aspect, the invention relates to a method for compensating propagation time differences in a light receiver circuit. In this context, the light receiver circuit comprises at least one light sensor and one control circuit for selecting and controlling the light sensor, a connecting line to a TDC circuit for evaluating a light signal received by the light sensor, and a test circuit. In addition, a test line is present in the light receiver circuit, on one end of which an electrical test signal source is arranged for generating a test signal. According to the method, an electrical test signal for the test circuit is first generated and then supplied to the test circuit of the light receiver circuit. The electrical test signal is forwarded to a control circuit, which is also connected to the light sensor. An output signal of the light sensor (measurement signal), based on a received light signal, is decoupled from the control circuit not later than the point in time when the test signal is forwarded. After the output signal of the light sensor is decoupled, the test signal is fed to an evaluation circuit. In a further step, the propagation times of the test signal are determined by capturing and evaluating the test signal in the evaluation circuit. The ascertained propagation times of the electrical test signal to the control circuit of the light receiver circuit, that is to say, preferably from the electrical test signal source to the control circuit, are determined. If there are multiple light sensors in multiple light receiver circuits, this is preferably done for each individual light receiver circuit.

A further step provides that the calculated propagation time is taken into account when a light signal of the light sensor in the light receiver circuit is evaluated. With the information obtained from the propagation times of the test signal, propagation time differences can be compensated and equalized on the basis of the position of individual light receiver circuits in an array.

Compensation of the calculated propagation times of the test signal to the light receiver circuit is preferably carried out minus the calculated propagation times of the test signal to the control circuit. With this compensation, it is possible to process extremely accurate measurement signals and clock signals to achieve a resilient, reliable measurement of distances or ascertain conditions in the surroundings of a light receiver circuit or of a lidar receiver that comprises the light receiver circuit.

In a further aspect, the invention relates to a light sensor array comprising multiple light receiver circuits. The array may include a TDC circuit for evaluating the signals transmitted by a control circuit of the light receiver circuit via a connecting line, as well as a test signal source for generating a test signal for the test circuit. A basic configuration of the light sensor array may comprise only a plurality of light receiver circuits, without the associated TDC circuits and test circuits.

The light sensor array preferably comprises a plurality of light receiver circuits, which are preferably arranged in a two-dimensional matrix having n×m light receiver circuits. In this context n and m are the number of the respective light receiver circuits in the rows or lines and/or the columns of the array, wherein n and m are each greater than or equal to 2, preferably greater than or equal to 10. In a basic version, the light sensor array may be configured without TDC circuits. The TDC circuits are then connected to the basic version of the array via the respective connecting lines of the light receiver circuits. For example, one TDC circuit may be provided for each column of light receiver circuits in the array, which is preferably implemented for many light receiver circuits, for example if the array comprises more than 200 columns and more than 50 rows, or if m and n are both greater than 50.

A further aspect of the invention relates to a lidar receiver for receiving optical events. The lidar receiver has a light sensor array, preferably as described above, and preferably with the associated TDC circuits with a plurality of light receiver circuits, and comprises a timecode generator that generates a timecode. The timecode preferably changes in defined increments. The timecode generator is connected to the control circuit of each lidar receiver circuit or to the respective TDC circuits in such a manner that the timecode is transmitted to the respective control circuit and/or TDC circuit.

In this context, a preferred embodiment of the lidar system provides that it is assigned to a hazard classification and has a corresponding hazard classification level. The hazard classification is preferably an Automotive-Safety-Integrity-Level (ASIL). The classification level is particularly preferably at least ASIL A, more preferably ASIL B.

In a further aspect, the invention relates to a vehicle with a lidar system, as described above, preferably with a lidar system with ASIL level.

Preferred embodiments of the invention are described in the dependent claims. It is understood that the features identified in the preceding text and those that will be explained in the following are usable not only in the combinations indicated in each case, but also in other combinations or alone without departing from the scope of the present invention. In particular, the method may be adapted to correspond to the variants described for the apparatus in the dependent claims.

In a preferred embodiment of the light receiver circuit, it is embodied in such a manner that the test circuit comprises a test-select switch in order to forward the test signal (of the test signal source) from the test line to the control circuit.

The test-select switch is preferably a transistor. Particularly preferably, a FET transistor is used.

In the context of the invention, it was observed that when large two-dimensional light sensor arrays are used, two critical aspects may arise. Light sensor arrays are typically constructed in such a manner that the TDC circuits, that is to say the time-digital converter-circuits, are arranged around the optical part of the array, i.e. the part with the light sensors. Accordingly, the TDC circuits are arranged on the edge, preferably the upper and/or lower edges of the light sensor part.

In light sensor arrays with many light sensors, the length of the lines routed from the light receiver circuits to the TDC circuits varies according to the position of the light sensor or the position of the light receiver circuit in the array. It may therefore be said that the line from each pixel to the TDC circuits arranged on the outside of the array is always different. This then engenders propagation time differences which may be considerably greater than the time resolution of the system. The TDCs and the readout transistors integrated in the light receiver circuit introduce still more error percentages through variations in the process, voltage and temperature. In this situation, the present invention represents a capability to measure these effects and compensate for them as well during operation.

Besides the above, the present invention also addresses an aspect related to functional safety. Here, the proper function of the TDCs, i.e. the integrated circuits used, must be checked regularly. The invention enables the detection of the majority of possible errors in the light receiver readout and in timestamp and timecode capture. The invention can be applied not only to the array but also to one-dimensional row sensors (with light receiver circuits in one row) and even to detectors with only a single pixel, that is to say a single light receiver circuit.

In contrast to the prior art, in the present invention the layout is simplified, since balanced line routing does not require as much attention. Propagation time lags caused by different line routing patterns are compensated by means of the invention. This enables considerably more complex designs of circuits in which an identical line length assured by the layout is not technically feasible. This in turn enables the creation of simply structured, and accordingly less expensive layouts, which end in resilient circuits. The light receiver circuit according to the invention and the light sensor arrays constructed therewith are thus more resilient and less expensive overall.

Moreover, the absolute accuracy of the light receiver circuits is also increased by measuring, evaluating and compensating for component-specific and IC-specific deviations caused by the manufacturing process, the temperature or voltage to which the component is currently exposed, in most cases during operation. This in turn then enables more consistent measurement results to be obtained when multiple light sensor arrays or lidar receivers are implemented in a lidar system.

For all components of lidar systems, typically components in the detector ICs of lidar systems and ASICs, which are often considered critical and system-critical, the invention further serves as a diagnostic tool and diagnostic capability for creating functionally safe designs.

In a preferred embodiment, the light receiver circuit according to the invention comprises a "test-select switch" in the test circuit. The function of the test-select switch is to forward the test signal to the control circuit, the so-called test-select switch is preferably switched by a select signal which is present at the switch when the switch is selected for switching to a test mode. The test-select switch is preferably designed as a transistor, particularly preferably a FET transistor is used.

In a further preferred embodiment of the light receiver circuit, the control circuit comprises a select switch for the purpose of decoupling and thus blocking the light sensor. The light sensor is decoupled whenever the test signal is present at the control circuit, to ensure that only one signal reaches the control circuit, specifically the test signal is allowed to pass when the propagation times of the circuit are to be measured. The select switch is preferably already switched to decouple the light sensor before the test signal is present at the control circuit. This arrangement reliably prevents two signals from reaching the control circuit. The select switch is preferably switched by a select signal, which is transmitted to the switch over a select line for example. The select signal is present, when the light receiver circuit is or has been selected for receiving a light signal by means of the light sensor. The select switch is preferably a transistor. Particularly preferably, it is embodied as an nMOS transistor.

In a preferred embodiment of the light receiver circuit, the light sensor is a diode. This allows for very small construction forms to be created. Particularly preferable are light sensors that are avalanche diodes. In practical application, single-photon avalanche diodes have proven to be very preferable as the light sensor in a particular embodiment of the light receiver circuit. A preferred embodiment of a light sensor array having a TDC circuit for evaluating the signals transmitted via the connecting line and a test signal source for generating the test signal for the test circuit contains a plurality of light receiver circuits. Preferably, at least two of the light receiver circuits are arranged in a row, wherein the circuits arranged in a row are connected to the same test line, Consequently, only one test line is required per row, thereby enabling the number of test lines from the test signal source to the light receiver circuits to be reduced. Of course, it is also possible to provide one test line per column of the light sensor array.

In a further preferred embodiment, the light sensor array comprises two test signal sources, one being arranged on each end of the test line. The test line thus connects the two test signal sources, wherein the light receiver circuits in a row (or column) may preferably also be connected to the test line. The test signal sources may be connected to multiple parallel test lines in order to direct the test signals to multiple light receiver circuits.

In this context, the test signal sources are operated consecutively, so that a test signal is sent to the test line by turns. In this case, "consecutively" is understood to mean that only one of the two test signal sources delivers a test signal to the test line at a time. However, the supply of test signals does not have to take place in alternating manner from the respective test signal sources. It is also possible that a test signal source emits several test signals one after the other, that is to say for example it is switched on and off several times before the other test signal source feeds a test signal into the test line.

However, alternating operation, wherein the test signal sources deliver a test signal to the test line by turns (in strict alternating sequence) is preferable, A preferred embodiment of the light sensor array provides that an evaluation circuit is included, and is preferably integrated in or forms part of the TDC circuit. The evaluation circuit evaluates the received test signals (and if applicable the measurement signals of the light sensors), and compensates propagation time differences between the light signals from different light sensors during the evaluation of the light signals. The compensation of the propagation time differences is based on the propagation time of the test signals received from the respective light receiver circuits, of which the signal propagation times are to be compensated.

The light sensor array preferably comprises a matrix-like arrangement of a the light receiver circuits, wherein multiple rows of light receiver circuits are present. Preferably, each of the rows is connected to its own test line, wherein each of the two ends of the test line is connected to one of the two test signal sources.

The invention also comprises a vehicle with a lidar system or with a light sensor array or a lidar receiver, as described above. The vehicle may be, without limitation thereto, a motor vehicle, a bicycle or tricycle, a truck or a bus or a passenger vehicle. A vehicle may be a commercial vehicle, an agricultural machine or a robot. In the present case, the term "vehicle" is also used to apply to a weapons system or fire control system or a missile or a drone or a satellite or a rocket or an aircraft or a floating structure (ship) or a submersible structure.

In the following text, the invention will be described and explained in greater detail with reference to several selected embodiments thereof in conjunction with the accompanying drawings. In the drawings.

Figure 1:
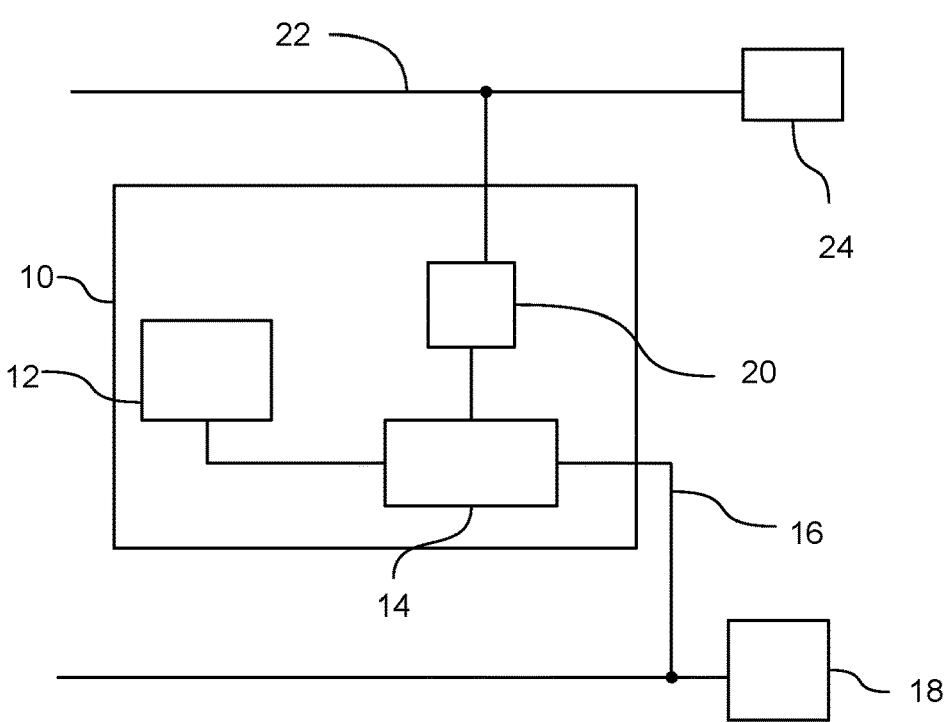
FIG. 1 shows a light receiver circuit according to one variant of the present invention.

FIG. 1 shows an embodiment of a light receiver circuit 10 according to the invention with a compensation of propagation times. The light receiver circuit 10 comprises at least one light sensor 12, one control circuit 14 for selecting and controlling the light sensor 12, and one and one connecting line 16 to a TDC circuit 18, which serves to evaluate a light signal received by the light sensor 12. The light receiver circuit 10 further comprises a test circuit 20, which is arranged between a test line 22 and the control circuit 14 and is able to switch a signal of the test line 22 through to the control circuit 14.

The test line 22 is connected to a test signal source 24, wherein the test signal source 24 generates an electrical test signal and is able to deliver the signal to the test line 22. The test circuit 20 is configured and arranged to establish a connection between the test line 22 and the control circuit 14, and to forward an electrical test signal that was generated by the test signal source 24 to the control circuit 14.

The control circuit 14 is connected to the light sensor 12 and is designed to direct a measurement signal of the light sensor 12 to the TDC circuit 18. Additionally, the control circuit 14 is designed to transfer a test signal that was forwarded from the test circuit 22 to the connecting line 16, and to forward the signal to the TDC circuit 18 via the connecting line. In this way, when the test circuit 20 is switched through the electrical test signal from the test signal source 24 reaches the TDC circuit 18, so that the propagation time of the electrical test signal from the test circuit 20 to the TDC circuit 18 may be calculated and evaluated.

The configuration of a light receiver circuit with control circuit and light sensor known in the prior art is thus expanded with the test circuit 20 for the purpose of transmitting a test signal from a test signal source 24 to the TDC circuit 18. At the same time, each light receiver circuit 10 is connected to a test line 22, so that when multiple light receiver circuits 10 are present, two or more such circuits may be connected to a test line 22, so that a test signal of a test signal source 24 can be transmitted to the individual light receiver circuits 10. This makes it possible to select individual light receiver circuits 10 for which the propagation time as far as the TDC circuit 18 is to be measured. The propagation time of the test signal may then be compensated during evaluation of a light signal received by the light sensor 12, which is transmitted to the control circuit 14 as a measurement signal.

Figure 2:
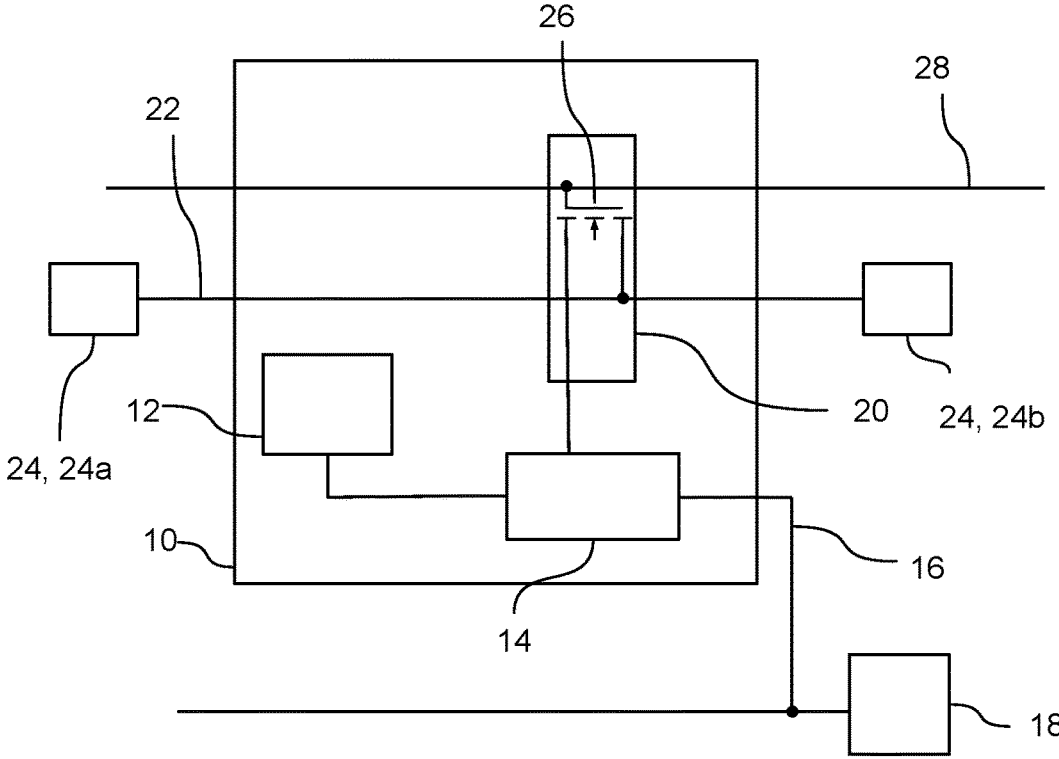
FIG. 2 shows a detailed view of the light receiver circuit.

FIG. 2 shows an expanded embodiment of the light receiver circuit 10 of FIG. 1. The test circuit 20 comprises a test-select switch 26, which establishes a connection from the test line 22 to the control circuit 14 as soon as a signal is incident on a test-select line 28 that is connected to the test-select switch 26, and switches the test-select switch 26 through. In this way, the individual light receiver circuit 10 can be selected for test operation when a test-select signal is applied to the test circuit 20 of the light receiver circuit 10 via the test-select line 28. A test signal from the test line 22 is then forwarded to the control circuit 14, since a connection has been established from test line 22 to control circuit 14.

From FIG. 2 it is evident that a test signal source 24 is arranged on each end of the test line 22, both of which sources are able to generate an electrical test signal. The test signals are then fed to the test line 22, preferably consecutively, by the test signal source 24a on the first end of the test line 22 and by the test signal source 24b on the other end of the test line, so that the propagation time of the electrical test signal in the test line and as far as the TDC circuit 18 can be calculated.

Figure 3:
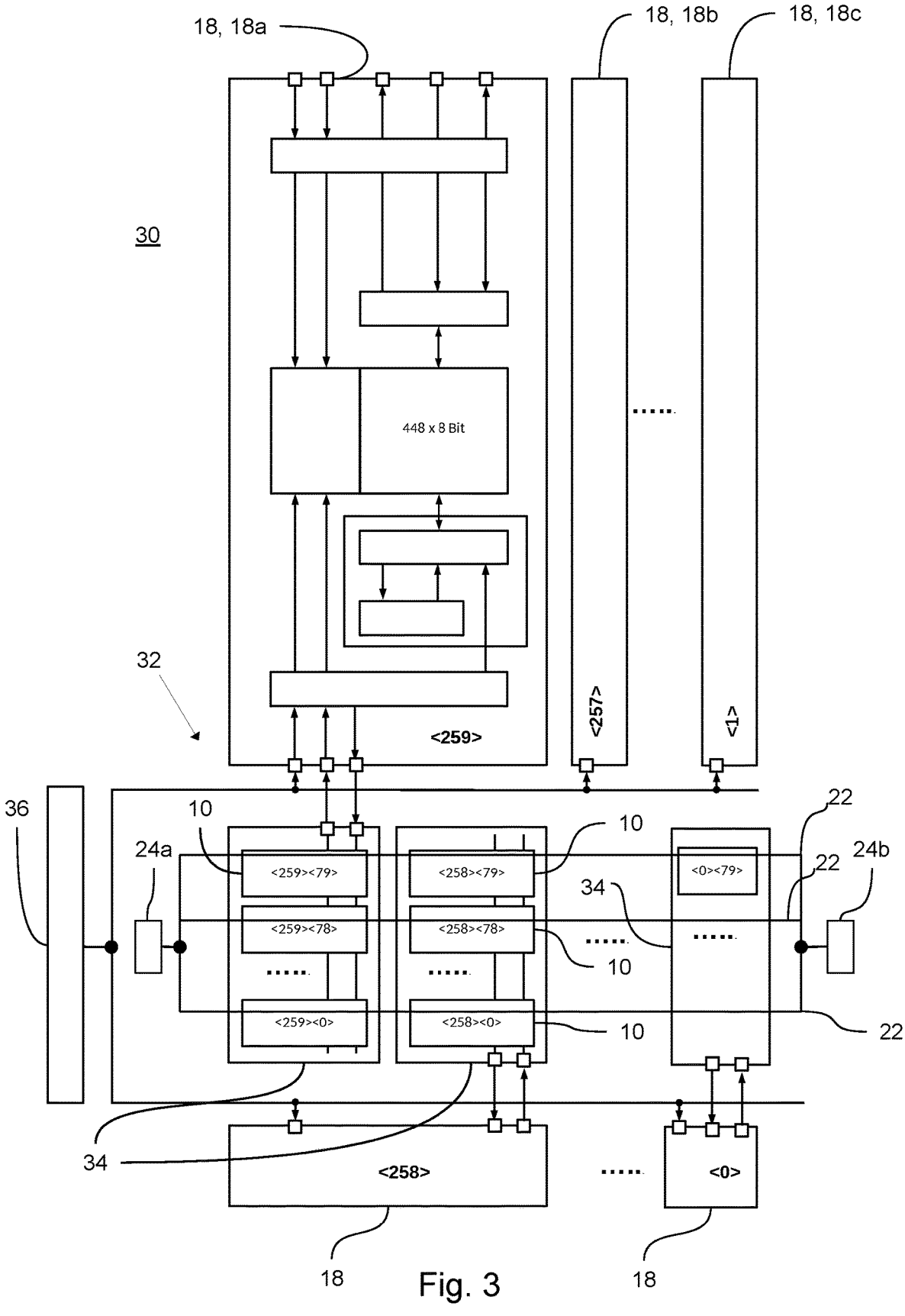
FIG. 3 shows a light sensor array with multiple light receiver circuits.

FIG. 3 shows a lidar receiver 30 with a light sensor array 32 having a plurality of light receiver circuits 10, which are arranged in a matrix with columns 34. Each of the columns 34 with multiple light receiver circuits 10 is assigned to a TDC circuit 18.

The lidar receiver 30 comprises a timecode generator 36, which generates a timecode. The timecode is changed in defined time increments, so that a fixed point in time can be read out from the code. The timecode is transmitted to the TDC circuit 18 for each of the column 34 of the light sensor array 32.

The lidar receiver 30 is constructed in such a way that the light sensor array 32 is arranged centrally, and in FIG. 3 a row of TDC circuits 18 is present both above and below it. A field of 256×80 light receiver circuits 10 is constructed, with the result that the lidar receiver 30 is able to capture and rapidly create a histogram for 256×80 pixels with the aid of an integrated 448-byte SRAM memory, for example. In order to construct a lidar receiver in the most compact form possible, TDC circuits 18, 18a, 18b, 18c for the odd columns 34 of the light sensor array 32 are arranged above the light sensor array 32, while multiple TDC circuits 18 are arranged below the light sensor array for the even columns 34.

Each of the rows of the array of light receiver circuits 10 in the individual columns 34 is connected to a test line 22, and a test signal source 24a, 24b is arranged on each end of each test line. By feeding an electrical test signal to the test lines 22 consecutively from test signal sources 24a and 24b, the propagation times of the measurement signals of the individual light receiver circuits 10 may be compensated as far as the corresponding TDC circuits 18, 18a, 18b, 18c.

The development of SPAD arrays with about 256×80 pixels and an integrated histogram can no longer be constructed in the conventional way in a 30 μm pixel pitch, in which the TDC circuits are each equipped with a 448 byte SRAM memory. Enlarging the pixel pitch would result in a larger surface area, and is unacceptable for many applications. In particular, this makes it impossible to create a compact wiring arrangement. In order to obtain the most compact structure possible, the TDC circuits are positioned alternatingly above and below the optical surface around the light sensor array. However, in the case of a light detector, which addresses one row at a time in "rolling shutter" mode, this causes row-related "fixed pattern noise", which must be prevented. Particularly for the rows with light sensors at the edge of the light sensor array, a pixel or light sensor has a very short connecting line to the associated TDC circuit, while the line for the adjacent light sensor (pixel) is routed once through the light sensor array on the other side. With a time resolution for the TDC circuit of a few picoseconds, an arrangement of such kind results in significantly poorer absolute accuracy of the lidar receiver or light sensor array. The light receiver circuit according to the invention solve this problem as well, because it is able to compensate for propagation time lags resulting from different line lengths. As was explained earlier, it thus becomes possible according to the invention to construct lidar receivers and light sensor arrays that have an extremely high degree of accuracy and can also operate precisely and resiliently in the picosecond range, and also deliver reliable results. The sensors or detectors constructed in this way have the advantage that they can also be equipped with a safety cover (also known as a FuSa (functional safety) cover), This further extends the range of possible applications for circuits of this kind.

Besides the above, it is also possible to use the test circuit of the light sensor arrays and lidar receivers for calibration purposes. Accordingly, the system does not have to be pre-calibrated. Rather, calibration does not have to be carried out until after the system has been installed (in a vehicle, for example). Calibrations can also be performed at certain time intervals to increase the measurement accuracy further still.

Figure 4:
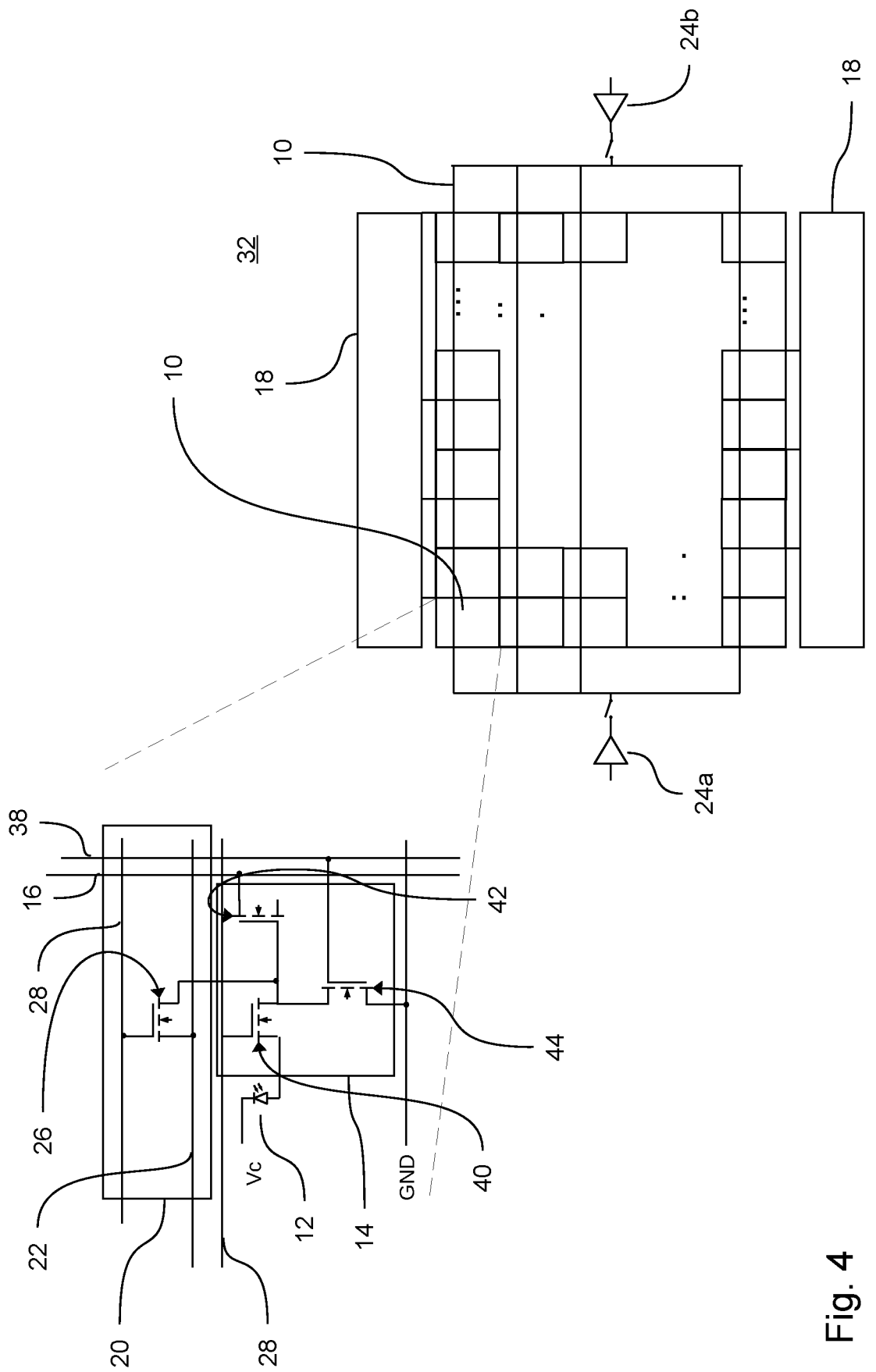
FIG. 4 shows a further detailed view of the light receiver circuit and the array.

FIG. 4 is a detail view of a part of the light sensor array 32 with a plurality of light receiver circuits 10, each having a plurality of TDC circuits 18 above and below the light sensor array 32. The respective TDC circuits 18 are only represented as a block.

FIG. 4 also shows that each row of light receiver circuits 10 in the light sensor array 32 is connected to a test line 22, via which the electrical test signals from both test signal sources 24a, 24b are able to reach the respective light receiver circuits 10. Preferably, all light receiver circuits 10 in a row of the array receive the test signals. Since the light receiver circuits 10 in the array are preferably connected in rows to a TDC circuit 18, test signals can be sent to all light receiver circuits 10 in a row simultaneously and evaluated simultaneously in the respective TDC circuits 18.

An inset in the top left part of FIG. 4 shows a part of a light receiver circuit 10 in more detail. The test circuit 20 comprises a test-select switch 26, which is switched by means of a switching signal (test-select signal) from the test-select line 28. This causes the test-select switch 26 to close, and an electrical test signal to be transmitted from the test line 22 to the control circuit 14.

In the embodiment shown here, the control circuit 14 comprises a select switch 40 for the purpose of switching or decoupling the light sensor 12, which may preferably be a photodiode. When a select signal is present on the select line 38, the select switch 40 is switched so that a measurement signal at the output from the light sensor 12 is switched through to a sense switch 42 which routes the signal to the connecting line 16. The measurement signal of the light sensor 12 then reaches the TDC circuit 18. When an electrical test signal from the test circuit 20 is present at the control circuit 14, the select switch 40 is opened so that the measurement signal of the light sensor 12 cannot reach the TDC circuit 18. Instead, the electrical test signal is present at the sense switch 42 and can be connected to the TDC circuit 18 that is connected to the connecting line 16 via connecting line 16.

The light receiver circuit 10 according to a preferred embodiment shown in FIG. 4 is designed such that the light sensor 12 is decoupled from the control circuit 14 as soon as the electrical test signal is present at the control circuit 14, preferably even before the test signal is present at the control circuit 14. The select switch 40 may preferably be embodied as a transistor, it is particularly preferably an nMOS transistor. The other switches of the light receiver circuit 10 may also be embodied as transistors, preferably as nMOS or pMOS transistors.

The light sensor 12 is preferably a diode, for example a photodiode or an avalanche diode. The light sensor is particularly preferably a single-photon avalanche diode.

In order to reset the light receiver circuit 10 again after a light signal has been received at the light sensor 12 and/or after an electrical test signal has been forwarded from the test signal source 24, a reset switch 44 is provided, which connects the select switch 40 to ground, and so resets the light receiver circuit. The reset switch 44 is triggered via a reset line 46. This may also be embodied as a transistor.

Figure 5A:
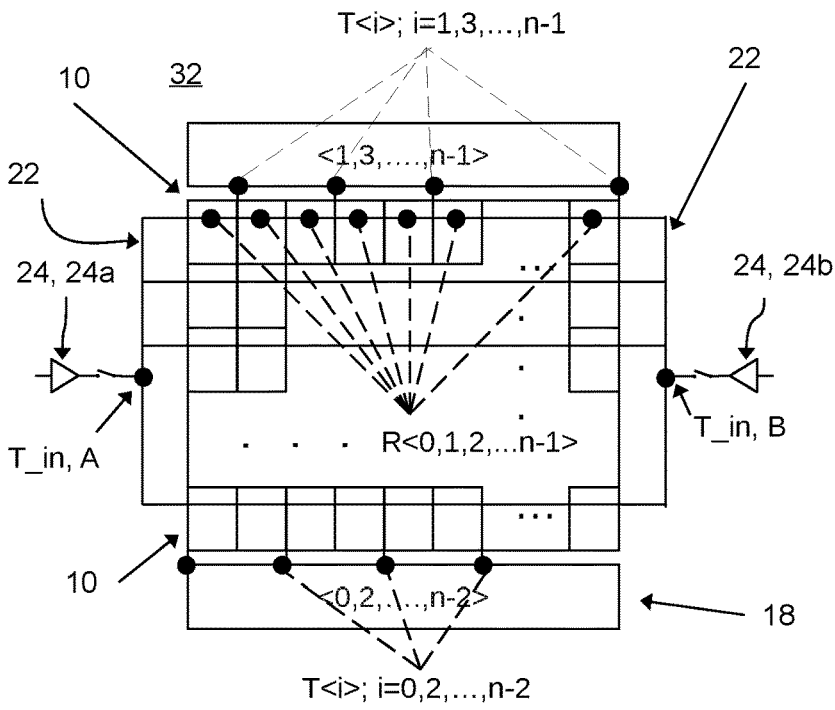
FIGS. 5a-5c show measurement points of an array and corresponding signal curves from measurements.
Figure 5B:
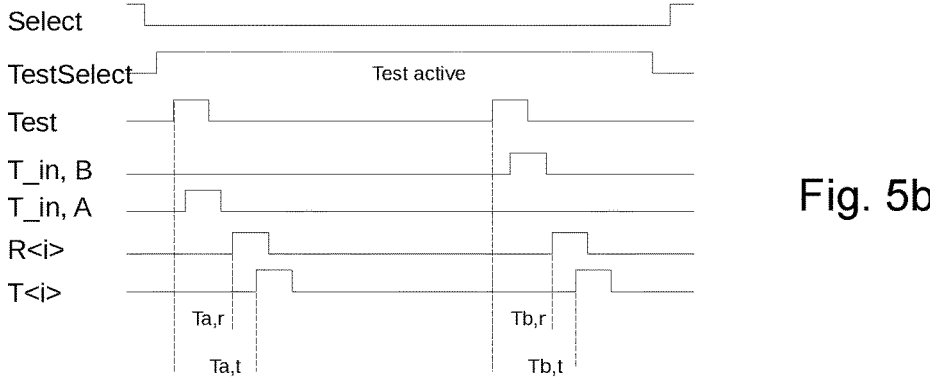
Figure 5C:
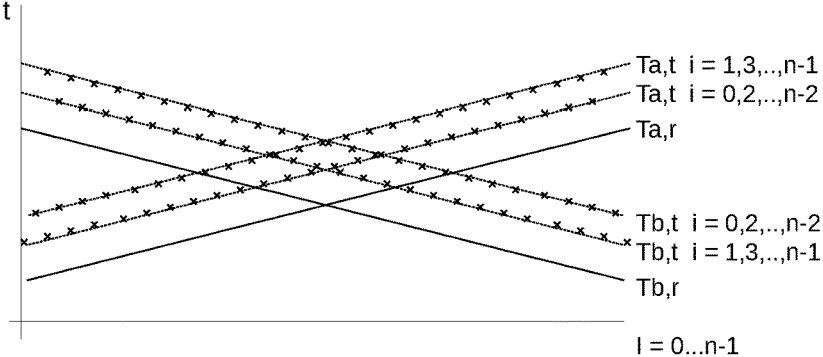

FIGS. 5a to 5c serve to explain the compensation of the propagation times of the measurement signals from the light sensors 12 as a function of the location of the light receiver circuit 10 in the light sensor array 32.

FIG. 5a shows the main elements of the light sensor array 32 from FIG. 4, with the light receiver circuits 10 arranged in a matrix and the two banks of TDC circuits 18 above and below the array. Even-numbered TDC circuits 18 for the even-numbered columns of light receiver circuits 10 are arranged below the array, while the odd-numbered TDC circuits are arranged above the array.

The black dots appearing in the array show measurements points or virtual measurement points for the signals in the circuit that are represented in FIG. 5b, together with their propagation times in FIG. 5c. Test points T<i> are measurement points at the output of the i-th TDC circuit 18. Measurement points R<i> are reference points at the input of the i-th test circuit 20 of the light receiver circuits 10.

It may be discerned from FIG. 5b that a select signal is no longer present at the select switch 40 and therefore decouples the light sensor 12 at the control circuit 14 even before a signal is present on the test-select line 28. After decoupling, the test-select signal is switched, and remains present while electrical test signals are transmitted to the control circuit 14 by test circuit 20. The electrical test signal is generated in the respective test signal sources 24 and is then present at the outputs of the test signal sources 24 a short time later, as may be evident in the signal curves of T_in, A and T_in, B. After a certain propagation time, the test signals can be measured at the virtual measurement points R<i>, while they are present a little later at the corresponding TDC circuit 18, in the form of measurement signals T<i> for the i-th TDC circuit 18.

FIG. 5c shows the propagation times of the individual measurement points according to whether the test signal is fed into the test line 22 from the left test signal source 24a or the right test signal source 24b. The test signals reach the inputs of the TDC circuits at different time points depending on the test signal source 24a, 24b by which the electrical test signal is generated and supplied to the test line, and depending on the TDC circuit 18 at which the signal is present. This graphic can be created for each row of the array of light receiver circuits 10. With the knowledge of these individual propagation times of the electrical test signals, it is then possible to compensate propagation times of measurement signals from the individual light sensors 12 of the respective light receiver circuits 10.

In the preferred light receiver circuits 10 with light sensor 12 for example as photodiode or SPAD, with select switch, reset switch, sense switch, the test-select switch 26 is arranged parallel to the select switch 40. The test-select switch 26 is designed in such a way as to obtain good matching with the select switch 40, to the effect that their switching times are similar. A test signal switches this switch or transistor to Vcc, that is to say the supply voltage, so that a signal similar to a photon detection by the light sensor 12 (SPAD for example) is generated at the sense switch 42. The light sensor 12 is not activated via the select switch 40 during the test, in order to avoid false positive events due to optical activity. If the test signal is supplied at a reference time, the delay of the signal chain and the function of the path from the sense switch 42 (or from the test select switch) to the output of the TDC circuit, the so-called "TDC time stamp" (measuring value at the output), can be measured. Thus, both the dynamic behavior (delay) and the static behavior (function) of the signal chain can be inspected.

In an arrangement of light receiver circuits 10 in an array, one test line 22 is used for all simultaneously addressed light receiver circuits 10. In order to measure the propagation time of the test signal in the test line, the test signal is supplied consecutively from one end or the other of the test line.

Figure 6:
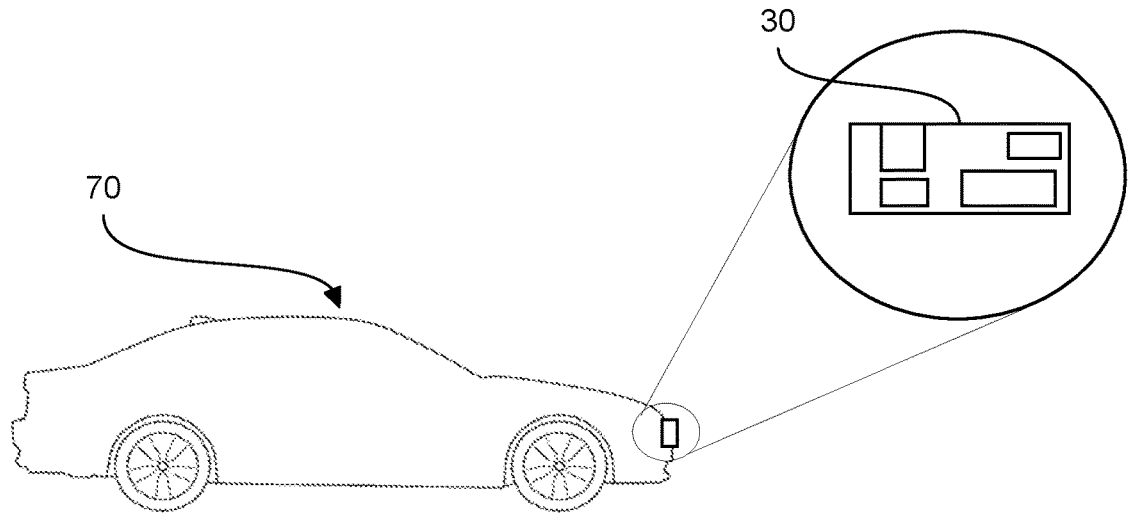
FIG. 6 shows a vehicle with a Lidar system with light sensor array.

FIG. 6 shows a vehicle 70 which is equipped with a lidar system for capturing optical events. The lidar system comprises a lidar receiver 30 with a light sensor array 32 and a driver circuit for a light source as well as a light source for emitting an electromagnetic light beam in the visible or invisible range. A control unit initiates the light source and the timecode generator of the lidar receiver and starts the lidar sensor array in order to evaluate optical events. The (visible or invisible) light beam emitted by the light source is reflected from an object and detected by means of the light sensor, wherein the propagation times are compensated by the light receiver circuits 10 and TDC circuits 18 according to the invention.

Figure 7:
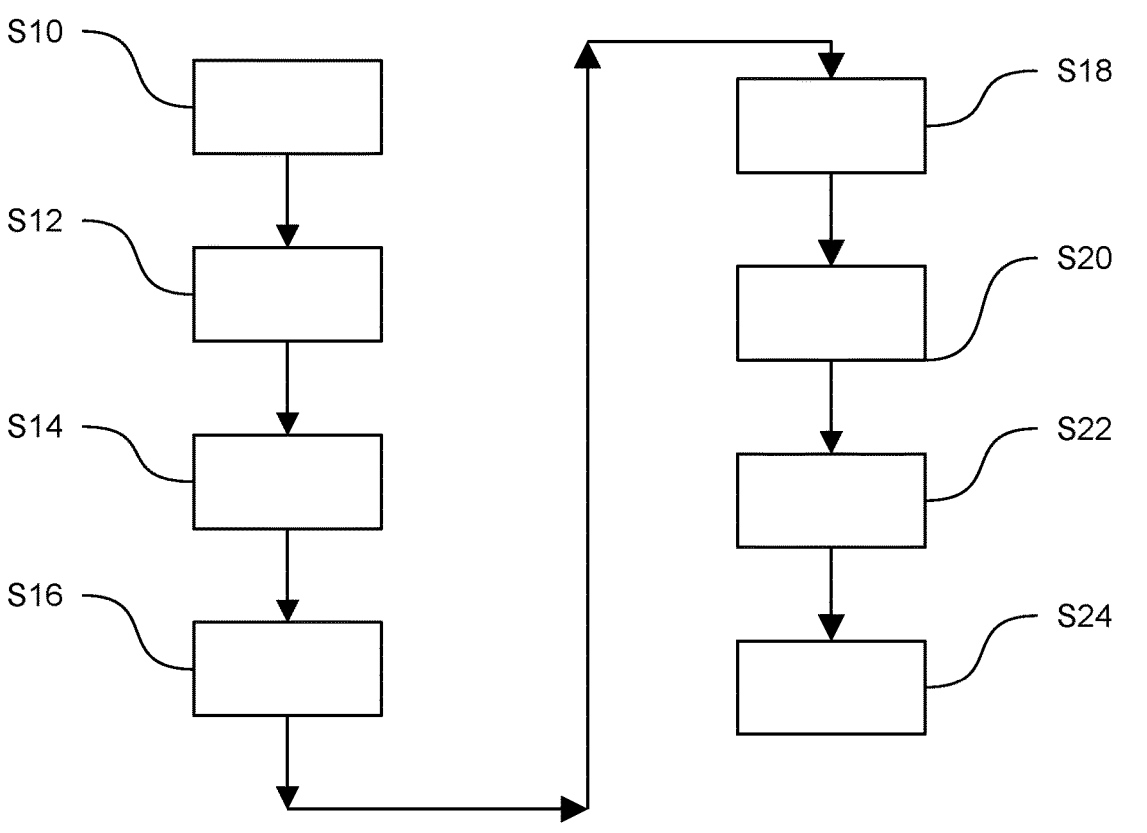
FIG. 7 is a schematic diagram of the method according to the invention for compensating for propagation time differences in a light receiver circuit.

FIG. 7 is a schematic diagram of the process sequence of the method according to the invention for compensating for propagation time differences in a light receiver circuit. In a first step of generation S10, a test signal is generated in a test circuit 20. The method includes a further step of supplying S12 the test signal to the test circuit 20 of a light receiver circuit 10, wherein the light receiver circuit 10 comprises a light sensor 12. This is followed by a step of decoupling S14 a measurement signal of the light sensor 12, wherein the decoupling takes place in a control circuit 14 of the light receiver circuit 10. A step of forwarding S16 the test signal from the test circuit 10 to the control circuit 14 is followed by step of routing S18 the test signal to an evaluation circuit by means of the control circuit 14, wherein the measurement signal is decoupled from the control circuit at the time when the test signal is forwarded. This means that the test signal is not routed to the evaluation circuit until the step of decoupling S14 has been completed. The evaluation circuit is preferably part of a TDC circuit 18, which in turn is a component of a light sensor array 32. This is followed by a step of calculating S20 the propagation time of the test signal from the test circuit 20 to the evaluation circuit, wherein in order to perform this step S20 the test signal is captured and evaluated in the evaluation circuit. A step of determining S22 the propagation time of the measurement signal from the light sensor 12 as far as a TDC circuit 18 is used to evaluate the measurement signal based on a light signal received by a light sensor 12. This is followed by a step of incorporating S14 the calculated propagation time of the test signal in the evaluation of the propagation time of the measurement signal of the light sensor 12 of light receiver circuit 10, wherein the incorporation is done by compensating the propagation time of the test signal from the test circuit 12 to the evaluation circuit.

The individual steps of the method according to the invention may also be performed in a different order or with the addition of further intermediate steps. The individual steps may be modified if applicable, or adapted to existing particularities of a light receiver circuit.

In a preferred embodiment of the light sensor array 32, the TDC circuit 18 includes the evaluation circuit that performs the evaluation of the test signal. Alternatively, it is possible that the evaluation circuit may have a separate circuit or may be part of another component of a lidar system or lidar receiver or a light sensor array. The evaluation of the test signals and measurement signals; the determination of the propagation times and the compensation of the propagation times during the evaluation and processing of the corresponding signals may also take place in the TDC circuit; alternatively, also in existing components of a circuit or subassembly. For example, when a lidar system with the light receiver circuit and light sensor array according to the invention is used in a vehicle, existing components of the vehicle can be used to carry out an evaluation of the signals, and incorporate them in the detection and recognition of objects and capturing the area surrounding the vehicle.

LIST OF REFERENCE NUMERALS

10 Light receiver circuit
12 Light sensor
14 Control circuit
16 Connecting line
18 TDC circuit
20 Test circuit
22 Test line
24 Test signal source
26 Test-select switch
28 Test-select line
30 Lidar receiver
32 Light sensor array
34 Column
36 Timecode generator
38 Select line
40 Select switch
42 Sense switch
44 Reset switch
46 Reset line
70 Vehicle

The invention claimed is:

1. A light receiver circuit with compensation of propagation times, with
   at least one light sensor;
   a control circuit for selecting and controlling the light sensor;
   a connecting line to a TDC circuit for evaluating a light signal received by the light sensor; and
   a test circuit arranged between a test line and the control circuit;
   wherein
      the test line is connected to a test signal source for generating an electrical test signal;
      the test circuit is configured and arranged to connect the test line to the control circuit and to forward the test signal to the control circuit; and
      the control circuit is configured and arranged to route a measurement signal of the light sensor to the TDC circuit, and to route an electrical test signal to the connecting line and further to the TDC circuit, in order to evaluate the electrical test signal and the propagation time of the test signal from the test circuit to the TDC circuit.

2. The light receiver circuit according to claim 1, wherein the test circuit comprises a test-select switch for forwarding the electrical test signal to the control circuit.

3. The light receiver circuit according to claim 2, wherein the test-select switch is a transistor.

4. The light receiver circuit according to claim 2, wherein the test-select switch is a FET transistor.

5. The light receiver circuit according to claim 1, wherein the control circuit comprises a select switch for decoupling the light sensor when the electrical test signal is present at the control circuit.

6. The light receiver circuit according to claim 1, wherein the control circuit comprises a select switch for decoupling the light sensor when before the electrical test signal is present at the control circuit.

7. The light receiver circuit according to claim 5, wherein the select switch is a transistor.

8. The light receiver circuit according to claim 5, wherein the select switch is an nMOS transistor.

9. The light receiver circuit according to claim 1, wherein the light sensor is a diode.

10. The light receiver circuit according to claim 1, wherein the light sensor is an avalanche diode.

11. The light receiver circuit according to claim 1, wherein the light sensor is a single-photon avalanche diode (SPAD).

12. A light sensor array comprising a plurality of light receiver circuits according to claim 1.

13. The light sensor array according to claim 12, wherein at least two of the light receiver circuits are arranged in a row, and the light receiver circuits in a row are connected to the same test line.

14. The light sensor array according to claim 12, comprising a TDC circuit for evaluating the signals transmitted by the control circuit via the connecting line, and a test signal source for generating a test signal for the test circuit.

15. The light sensor array according to claim 12, wherein the light sensor array comprises two test signal sources, one of which is arranged at each end of the test line, wherein the test signal sources output an electrical test signal into the test line consecutively.

16. The light sensor array according to claim 15, wherein the test signal sources output an electrical test signal into the test line alternatingly.

17. The light sensor array according to claim 12, wherein the light sensor array comprises an evaluation circuit, which evaluates the received test signals and compensates propagation time differences of the measurement signals of different light sensors during the evaluation of the measurement signals.

18. The light sensor array according to claim 17, wherein the evaluation circuit is comprised in the TDC circuit.

19. The light sensor array according to claim 12, wherein the light receiver circuits of each row are connected to a test line, wherein the two ends of the test lines are each connected to one of the two test signal sources.

20. A lidar receiver for capturing optical events, comprising a light sensor array according to claim 12 with a TDC circuit and a test signal source for generating an electrical test signal, and comprising a timecode generator which generates a timecode that changes in defined time increments, and which is in connection with the control circuit of each light receiver circuit in such a manner that the timecode is transmitted to the respective control circuit.

21. A lidar system for capturing optical events, comprising a lidar receiver according to claim 20 and a driver circuit for a light source and a light source for emitting an electromagnetic light beam in the visible or invisible range, wherein a control unit initiates the light source and the timecode generator, and starts the light sensor array in order to evaluate optical events.

22. A vehicle with a lidar system according to claim 21.

23. A method for compensating propagation time differences in a light receiver circuit according to claim 1, comprising the following steps:

generating an electrical test signal for a test circuit;

supplying the electrical test signal to the test circuit of a light receiver circuit, which comprises a light sensor;

decoupling a measurement signal of the light sensor in a control circuit;

forwarding the electrical test signal from the test circuit to the control circuit;

supplying the test signal to an evaluation circuit by means of the control circuit, wherein the measurement signal is decoupled from the control circuit at the time the test signal is forwarded;

determining the propagation time of the test signal from the test circuit to the evaluation circuit by capturing and evaluating the test signal in the evaluation circuit;

determining the propagation time of the measurement signal of the light sensor to a TDC circuit for evaluation of the measurement signal based on a light signal received by the light sensor; and incorporating the determined propagation time of the test signal in the evaluation of the propagation time of the measurement signal of the light sensor of the light receiver circuit by compensating the propagation time of the electrical test signal from the test circuit to the evaluation circuit.

24. The method according to the claim 7, wherein the TDC circuit comprises the evaluation circuit.

* * * * *